UNITED STATES PATENT OFFICE.

PAUL G. WILLETTS, OF FAIRMONT, WEST VIRGINIA.

REFRACTORY INSULATION.

1,374,538.  Specification of Letters Patent.  Patented Apr. 12, 1921.

No Drawing.  Application filed December 17, 1919. Serial No. 345,470.

*To all whom it may concern:*

Be it known that I, PAUL G. WILLETTS, a citizen of the United States, residing at Fairmont, in the county of Marion and State of West Virginia, have invented new and useful Improvements in Refractory Insulations, of which the following is a specification.

My invention relates to refractory insulation for furnaces, boiler settings, retorts, kilns, ovens, flues, linings, floors, walls, ceilings, and the like.

One object of this invention is to provide compositions of matter for manufacturing refractory insulation. Another object of this invention is to provide methods by which such compositions may be made into articles having predetermined degrees of refractoriness and heat insulation. Other objects appear hereinafter.

I give herein a few examples illustrative of my invention. For obtaining results other than these examples secure, the skill of the worker is to some degree needed. The description following will lay down such rules and principles as will lead those skilled in the art to which this invention relates to reach such predetermined results as lie within the limits of the invention.

A moist homogeneous mass of silicious open-burning, or porous-burning clay, lignite, and alumina, all in a more or less finely divided state is formed into a desired article, as a brick, and carefully dried so as to prevent its cracking. A drying temperature around 100° F. has proved satisfactory. After the drying is completed to about the ordinary degree, the brick is heated slowly up to, say 1600° F. During the heating the lignite undergoes a transformation, the greater part thereof, around 95% of its weight, being driven off in a gaseous condition, the residue being ash collected in pores or cells of the brick. The brick, having been heated or burned until all the lignite has been transformed, becomes a refractory material having very high heat insulation value, or very high resistance to the penetration of heat; in other words, it has become a very poor conductor of heat. If the brick be heated to a still higher degree, say to 2000° F. or 2300° F., the ash in the cells of the brick becomes a glass, slag, or cinder, and the brick becomes more refractory and its heat-conductivity becomes only slightly less.

While any plastic open-burning, or porous-burning clay may be used in this invention, I prefer to utilize a plastic fire-clay having a high silicon content. Besides the high silicon content in chemical combination in the clay, I prefer that the clay carry additional silicon combined in free silica, which forms around 55% of the clay. This free silica can be separated from the clay, the particles thereof being however too minute to be readily noticeable in the general uses of the clay. Such clay as that just described may be produced synthetically, but it is found in nature beneath lignite coal formations. Such clay, particularly when ground to pass through a 100-mesh screen, is very plastic when mixed with water, has great strength, and can hold large percentages of other material such as silica and grogs used in the manufacture of bricks, for example.

I prefer that the carbonaceous material be lignite coal. It gives best results when ground to pass through a screen having at least four meshes to the inch. It may be employed when ground to powder fine enough to float in the air.

I prefer that the clay ingredients shall be not under 40% by weight, or the lignite content be not above 60% by weight, prior to burning. I have obtained products of high refractory and heat-insulation values by burning a homogeneous mixture containing about 47.5% by weight of said highly silicious clay, ground to pass through a 100-mesh screen, about 47.5% of lignite coal ground to pass through an 18-mesh screen, and not through a 100-mesh screen, and about 5% of alumina, ground to pass through a 100-mesh screen. Of course, good or fair results can be had, when the fineness of the ingredients vary from that given, without departing from this invention. The lignite may range in size from particles one-fourth of an inch across down to a powder light enough to float in air. The clay may range from 25% to 95% by weight, lignite from 5% to 75%; and alumina from 1% to 10%.

By increasing the clay content, the products become more refractory and by increasing the lignite content the products have higher heat-insulation value. For example, a brick containing the said silicious clay 25%, lignite 70%, and alumina 5%, has very high heat-insulation value with a fusion point around 2900° F., while a brick having said clay 94%, lignite 5%, and alumina 1% is more highly refractory with slightly less heat-insulation value.

Alumina is added to the clay and lignite to increase the melting point of the products.

By adding to one or more faces of the refractory insulating material hereinbefore described a mixture of plastic bond clay, calcined or raw flint clay, and alumina, a composite body is formed suitable for high temperature conditions, the coated faces withstanding great shocks without fracture, having excellent wearing qualities, and absorbing intense heat without fusion, these results being each superior to what can be had with the refractory insulating material alone. These two kinds of material can be made into composite commercial products, such as bricks, having one part a direct opposite of the other, that is, one part being an absorbant or conductor of heat, and the other an insulator or a resistance to the penetration of heat. Such composite material may have one component varying from 1% to 99%, the other component completing the material. By facing the refractory insulating material with the said refractory material just described, a composite material is formed such that the faced surface protects the more easily abraded and broken deeper parts, which prevent deep penetration by the heat transmitted through the facing. By such composite material the heat is prevented from passing through the material and being wasted. My refractory insulation, whether coated or not with highly refractory material, retains the heat in the zone where it is needed, and, even if the ash in the cells is vitrified or turned to slag or cinder, its heat-insulating value is retained to such a large degree that such value is still superior to that of ordinary fire-brick.

My heat-insulating material may be made into the required shapes for linings of refrigerators, ice-boxes, fireless cookers, stoves, etc., and burned to a point where it will not shrink appreciably. This material may after such burning have an enamel face, edge, or side fused thereupon, thereby making the resultant article impervious to water, fumes, and gases, and strictly sanitary and capable of great resistance to penetration of either heat or cold to any appreciable degree.

For the manufacture of articles for purely refractory purposes, such, for example, as is required for fire-brick, I have obtained most excellent products by burning material comprising raw or calcined flint clay 50% by weight, alumina 5% by weight, plastic silicious clay 25% by weight, and lignite 20% by weight. The proportion of the two clays may vary from 70% of either one to 10% of the other. The lignite may vary from 5% to 50% by weight. Material more resistant to fushion may be made by reducing the proportions of one or both clays and increasing the alumina to replace the clay or clays. This material is satisfactory for all kinds of glass-house refractories or flux resisting materials, bricks of all kinds used in coke-ovens, furnaces, boiler-linings, flue-linings, chimneys, flues, conveyers of heat, and the like.

The material made by the principles of this invention are lighter and stronger, and a more reliable fusion-point can be assured for the same than for ordinary refractory material. The cells of my material do not contain material which can by expansion produce any destructive strain, as they contain ash or slag with more or less dead air.

In burning products made from my composition, care should be taken that the heat be slow enough to allow substantially all of the carbon in the lignite to be eliminated. In the thorough mixing of the ingredients, the particles of the lignite are surrounded by thin coats or films of clay. The heat during burning drives off gases from the lignite through the walls of the cells which the clay forms about the lignite particles. Some air filters through the cell-walls and oxidizes some of the lignite, the gaseous products passing out through the cell-walls. It is, therefore, for best results that the heating be conducted both as to temperature and time so as to allow all the carbon of the lignite to be eliminated. If the cell-walls are broken down or vitrified the egress of the gases from the lignite will be more or less obstructed, leaving the interior of the burned article containing a large mass of carbon which materially lessens the refractory and heat-insulating values of the article. When properly burned the finished article is substantially homogeneous throughout as to color and structure.

It is seen that the cells in the products are larger as the particles of lignite are larger. When the lignite is powdery the products have very fine cells, though the contents of all the cells do not probably differ from those of products having larger cells.

While I do not confine myself to a definite theory, it appears that the contraction of the clay (aluminate of silicon) constituent is off-set very greatly either by the silica or by the expansion of the gaseous products due to the lignite, or by both.

The alumina in my composition raises the fusion point of the product. My material would have very high refractory and heat-insulating values, if alumina were omitted. In claims not mentioning it, it may be regarded either present or absent.

I claim:

1. A composition of matter to be burned for the production of refractory heat-insulating material, containing finely divided lignite coal intimately mixed with plastic fire-clay having a high silica content.

2. A composition of matter to be burned for the production of refractory heat-insulating material, containing finely divided carbonaceous material intimately mixed with plastic fire-clay having a high silica content.

3. A composition of matter to be burned for the production of refractory heat-insulating material, containing finely divided lignite coal intimately mixed with plastic fire-clay having a high silicon content, the greater part of the silicon being combined in free silica.

4. A composition of matter to be burned for the production of refractory heat-insulating material, containing finely divided carbonaceous material intimately mixed with plastic fire-clay having a high silicon content, the greater part of the silicon being combined in free silica.

5. A composition of matter to be burned for the production of refractory heat-insulating material, containing finely divided lignite coal intimately mixed with plastic fire-clay having a high silicon content, the greater part of the silicon being combined in free silica, and the latter forming about 55% of the clay by weight.

6. A composition of matter to be burned for the production of refractory heat-insulating material, containing finely divided carbonaceous material intimately mixed with plastic fire-clay having a high silicon content, the greater part of the silicon being combined in free silica, and the latter forming about 55% of the clay by weight.

7. A composition of matter to be burned for the production of refractory heat-insulating material, containing finely divided lignite coal intimately mixed with clay and silica.

8. A composition of matter to be burned for the production of refractory heat-insulating material, containing finely divided lignite coal intimately mixed with clay and silica and finely divided alumina.

9. A composition of matter to be burned for the production of refractory heat-insulating material, containing finely divided lignite coal intimately mixed with clay and silica in about equal proportions by weight.

10. A composition of matter to be burned for the production of refractory heat-insulating material, containing finely divided lignite coal from 5% to 75% by weight, highly silicious plastic clay from 25% to 95% by weight and alumina from 1% to 10% by weight.

Signed at Pittsburgh, Pa., this 4th day of December, 1919.

PAUL G. WILLETTS.